(12) United States Patent
Poteet et al.

(10) Patent No.: US 12,487,178 B2
(45) Date of Patent: Dec. 2, 2025

(54) SYSTEMS AND METHOD FOR MEASURING PATHOGENS AND BIOMARKERS IN FLUIDS

(71) Applicant: Lightsense Technology, Inc., Tucson, AZ (US)

(72) Inventors: Wade M. Poteet, Vail, AZ (US); Terje A. Skotheim, Tucson, AZ (US); Bruce I. Berkoff, Tualatin, OR (US); Michael Stanley, Mesa, AZ (US); Phillip Armstrong, Boalsburg, PA (US)

(73) Assignee: LIGHTSENSE TECHNOLOGY, INC., Tucson, AZ (US)

( * ) Notice: Subject to any disclaimer, the term of this patent is extended or adjusted under 35 U.S.C. 154(b) by 523 days.

(21) Appl. No.: 18/053,625

(22) Filed: Nov. 8, 2022

(65) Prior Publication Data

US 2023/0143882 A1    May 11, 2023

Related U.S. Application Data

(60) Provisional application No. 63/276,945, filed on Nov. 8, 2021.

(51) Int. Cl.
*G01N 21/64* (2006.01)
*G01N 21/33* (2006.01)
(Continued)

(52) U.S. Cl.
CPC ......... *G01N 21/6428* (2013.01); *G01N 21/33* (2013.01); *G01N 21/35* (2013.01);
(Continued)

(58) Field of Classification Search
CPC ... G01N 2021/3595; G01N 2021/6417; G01N 2021/6439; G01N 21/33; G01N 21/35;
(Continued)

(56) References Cited

U.S. PATENT DOCUMENTS 5,736,410 A    4/1998 Zarling
6,649,416 B1    11/2003 Kauer
(Continued)

FOREIGN PATENT DOCUMENTS

| CN | 106018510 | 10/2016 |
|---|---|---|
| WO | 2008002659 | 1/2008 |
| WO | 2008156617 | 12/2008 |

OTHER PUBLICATIONS

"Light Scattering by Tissue & Cells," 2022, 5 pages, Hunter College, New York, New York.
(Continued)

*Primary Examiner* — Jennifer Wecker
(74) *Attorney, Agent, or Firm* — Jaffery Watson Hamilton & DeSanctis LLP

(57) ABSTRACT

Preparing and analyzing a fluid for a multi-spectral analysis is disclosed. The multi-spectral analysis includes providing two or more separate and independent types of spectroscopies including at least a first spectrometer and a second spectrometer of a spectrometer system to examine the fluid after that fluid has passed through one or more sample preparation processes to increase a purity of a target biological entity in the fluid and thereby enhance signal to noise ratios in measurements and related data analysis operations.

21 Claims, 5 Drawing Sheets

Consumable 100

(51) Int. Cl.
*G01N 21/35* (2014.01)
*G01N 21/47* (2006.01)
*G01N 33/569* (2006.01)

(52) U.S. Cl.
CPC .......... *G01N 21/47* (2013.01); *G01N 33/569* (2013.01); *G01N 2021/6439* (2013.01); *G01N 2201/0221* (2013.01)

(58) Field of Classification Search
CPC .. G01N 21/3577; G01N 21/359; G01N 21/47; G01N 21/64; G01N 21/6428; G01N 21/65; G01N 2201/0221; G01N 33/569
See application file for complete search history.

(56) References Cited

U.S. PATENT DOCUMENTS

| | | |
|---|---|---|
| 7,829,345 B1 | 11/2010 | MacDonald |
| 8,227,260 B2 | 7/2012 | Yguerabide et al. |
| 8,368,034 B2 | 2/2013 | Poteet |
| 8,502,168 B1 | 8/2013 | Poteet |
| 8,652,800 B2 | 2/2014 | Walsh et al. |
| 9,013,686 B2 | 4/2015 | Poteet et al. |
| 12,292,376 B2 | 5/2025 | Poteet |
| 2003/0222222 A1 | 12/2003 | Dong |
| 2005/0244978 A1 | 11/2005 | Uluyol |
| 2006/0073483 A1 | 4/2006 | White |
| 2007/0037135 A1 | 2/2007 | Barnes et al. |
| 2007/0075208 A1 | 4/2007 | Koo |
| 2007/0134681 A1 | 6/2007 | Liew |
| 2009/0252650 A1 | 10/2009 | Lakshmanan |
| 2009/0326383 A1 | 12/2009 | Barnes |
| 2011/0139990 A1 | 6/2011 | Xie |
| 2012/0056093 A1 | 3/2012 | Poteet |
| 2014/0192365 A1 | 7/2014 | Mortada |
| 2014/0303932 A1 | 10/2014 | Snow |
| 2016/0066775 A1 | 3/2016 | Hunter |
| 2017/0176338 A1 | 6/2017 | Wu |
| 2017/0184453 A1 | 6/2017 | Wang |
| 2019/0056315 A1 | 2/2019 | Kinrot |
| 2019/0226989 A1 | 7/2019 | Karpf |
| 2019/0293620 A1 | 9/2019 | Farkas |
| 2020/0043574 A1 | 2/2020 | Mehrotra |
| 2020/0190959 A1 | 6/2020 | Gooneratne |
| 2021/0010935 A1 | 1/2021 | Poteet |
| 2022/0268751 A1 | 8/2022 | Farkas |
| 2022/0381681 A1 | 12/2022 | Poteet |
| 2022/0384043 A1 | 12/2022 | Poteet |
| 2022/0397458 A1* | 12/2022 | Sabry ........................ G01J 3/45 |

OTHER PUBLICATIONS

Arthur L. Koch and Elvera Ehrenfeld, "The Size and Shape of Bacteria by Light Scattering Measurements," Biochim, Biopsy's. Acta, Apr. 16, 1968, pp. 262-273.

Catalina E. Alupoaei et al., "Quantitative Spectroscopy Analysis of Prokaryotic Cells: Vegetative Cells and Spores," Biosensors and Bioelectronics 19, 2004, pp. 893-903, Elsevier B.V.

Le Qiu et al., "Rapid Detection and Identification of Bacteria Directly from whole Blood with Light Scattering Spectroscopy based Biosensor," 2021, 26 pages, Elsevier B.V.

Lewis R. Dartnell et al., "Fluorescence Characterization of Clinically-Important Bacteria," PLOS One, Sep. 2013, 13 pages, vol. 8, Issue 9, e75270.

Michael Stanley et al., "Sensor Analysis for the Internet of Things (Synthesis Lectures on Algorithms and Software in Engineering)," Feb. 2018, Chapter 3, p. 29 with cover sheet, Morgan & Claypool Publishers.

Milad Rabbani Esfahani et al., "Extinction, Emission, and Scattering Spectroscopy of 5-50 nm Citrate-Coated Gold Nanoparticles: An Argument for Curvature Effects on Aggregation," Spectrochimica Acta Part A: Molecular and Biomolecular Spectroscopy 175, 2017, pp. 100-109, Elsevier B.V.

Yaniv Shlosberg et al., "Fast Label-Free Identification of Bacteria by Synchronous Fluorescence of Amino Acids," Analytical and Bioanalytical Chemistry, Sep. 7, 2021, 11 pages, Springer-Verlag GmbH Germany.

Yong-Le Pan et al., "Review of Elastic Light Scattering from Single Aerosol Particles and Application in Bioaerosol Detection," Journal of Quantitative Spectroscopy & Radiative Transfer, Jan. 11, 2022, 25 pages.

Yuxia Hu et al., "Analytic Method on Characteristic Parameters of Bacteria in Water by Multiwavelength Transmission Spectroscopy," Journal of Spectroscopy, Dec. 2017, 8 pages, vol. 2017.

Restriction Requirement for U.S. Appl. No. 16/921,614, mailing date Jun. 29, 2023, 8 pages, USPTO.

Non-Final Office Action for U.S. Appl. No. 16/921,614, mailing date Sep. 27, 2023, 36 pages, USPTO.

Final Office Action for U.S. Appl. No. 16/921,614, mailing date Mar. 22, 2024, 19 pages, USPTO.

Advisory Action for U.S. Appl. No. 16/921,614, mailing date May 31, 2024, 3 pages, USPTO.

Non-Final Office Action for U.S. Appl. No. 16/921,614, mailing date Aug. 6, 2024, 27 pages, USPTO.

Final Office Action for U.S. Appl. No. 16/921,614, mailing date Nov. 27, 2024, 23 pages, USPTO.

Non-Final Office Action for U.S. Appl. No. 16/921,614, mailing date Apr. 10, 2025, 28 pages, USPTO.

Non-Final Office Action for U.S. Appl. No. 17/825,942, mailing date Apr. 5, 2024, 17 pages, USPTO.

Notice of Withdrawal From Issue Branch for U.S. Appl. No. 17/825,942, mailing date Oct. 15, 2024, 13 pages, USPTO.

Notice of Allowance for U.S. Appl. No. 17/825,942, mailing date Feb. 10, 2025, 13 pages, USPTO.

Notice of Allowance for U.S. Appl. No. 17/825,942, mailing date Jul. 31, 2024, 13 pages, USPTO.

Corrected Notice of Allowance for U.S. Appl. No. 17/825,942, mailing date Mar. 19, 2025, 8 pages, USPTO.

Final Office Action for U.S. Appl. No. 16/921,614, mailing date Aug. 21, 2025, 39 pages, USPTO.

* cited by examiner

Consumable 100

SYSTEMS AND METHOD FOR MEASURING PATHOGENS AND BIOMARKERS IN FLUIDS

RELATED APPLICATIONS

This application claims the priority of U.S. Provisional Application No. 63/276,945, filed Nov. 8, 2021, the contents of which are incorporated by reference herein.

FIELD OF THE INVENTION

Example embodiments relate generally to the field of analysis and examination of fluids that contain biological entities using two or more particular spectroscopic processes and a particular sample preparation and data analysis set of processes.

BACKGROUND

Spectroscopy is the study of the interaction of matter with electromagnetic energy including, for example, spectroscopies in which the electromagnetic energy is in the form of light beams of various wavelengths. Known measuring systems deliver a beam of light to the sample, where energy from that beam interacts with molecules within the sample to elicit the measured emitted, absorbed, and/or scattered energy for analysis. These measuring systems that determine certain conditions in humans, animals, and liquid samples using spectroscopy use comparison of analysis results to a database of signatures specific to a type of molecule being examined. These systems may use a spectrometer or other spectrum-sensing method to gather spectral data from the sample. The results may verify whether the sample contains a biological entity of interest, i.e., viruses, bacteria, or biomarkers which could indicate a condition or conditions in the host from which the sample was obtained.

SUMMARY

Example embodiments generally relate to systems and methods of preparing a fluid for a multi-spectral analysis that includes providing two or more separate and independent types of spectroscopies including a first miniature spectrometer and a second miniature spectrometer of a spectrometer system in a wavelength range of 200 nm to 14 µm to examine a fluid after that fluid has passed through one or more separate sample preparation processes that are designed to increase a purity of a target biological entity in the fluid, to reduce a background or non-targeted entity in the fluid, and thereby enhance signal to noise ratios in measurements and related data analysis operations. The methods can further include generating, with the first miniature spectrometer, a first absorption spectral output based on the fluid and generating, with the second miniature spectrometer, a second emission spectral output based on the fluid.

Other features and advantages will be apparent from the accompanying drawings and from the detailed description that follows below.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed by the claims and their equivalents.

DETAILED DESCRIPTION

Figure 1:
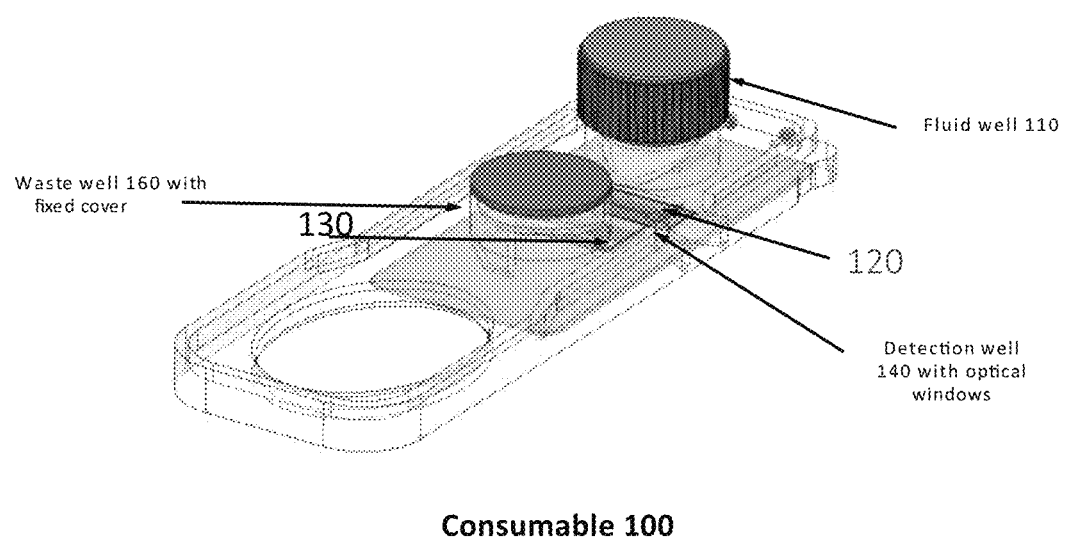
FIG. 1 illustrates a frontal view of disposable holder of a fluid in accordance with one embodiment.

Standard spectrometer techniques have difficulty when the target substance is present at a low concentration within a mixture having many distractors, such as a virus in a biological fluid like saliva. These standard spectrometer techniques also may not measure the desired target molecule (s) directly, due to insufficient signal (or signal to noise ratios) or too many background signals, often because they use a single spectroscopic method, frequently do not prepare the sample by concentrating the molecules of interest, and may not apply data reduction and machine learning techniques to the data stream produced by the measuring spectral device. The data stream from one spectroscopic method alone may not have sufficient data for many of these techniques.

The spectrometer systems of the present disclosure, and related methods of sample preparation and data analysis, allow very sensitive identification and quantification using enhanced photodetection spectroscopy (EPS). By utilizing two or more separate spectroscopic processes, along with enhancement methods like physical concentration of the molecules of interest, and advanced signal processing along with machine learning, the effective signal-to-noise (S/N) properties of the measurements can be enhanced by a factor of as much as $10^6$, using combinations of five optimization operations described below as compared to conventional techniques that do not utilize these optimization operations.

As a first optimization, by restricting the data to certain spectral regions to show a smaller range but more sensitivity, example methods can improve S/N properties in the range 10-100× over normally analyzed spectra. As a second optimization, by increasing integration times for data acquisition in the spectrometer, example methods can provide S/N property gain of an additional ~5-10× over restriction to certain spectral regions alone.

As a third optimization, combination of multiple types of spectra via "data-fusion" (e.g., 2-6 types of spectra) example methods can provide S/N property gain of an additional of 10-100× over restriction of spectral regions and increasing integration times. As a fourth optimization, by utilizing machine learning (ML) techniques with specific training sets, example methods can increase the effective S/N ratio by another ~5-10× in system sensitivity. As a fifth optimization, integration of multiple spectroscopies can be utilized. For example, an enhancement by a factor of 6,000 with respect to the S/N ratio occurs by integrating two independent spectroscopies for identification of a compound medication.

The present disclosure refers to targeting molecules or biological markers. It is noted that although viruses and bacteria are normally not referred to as "molecules", the object of study is either a viral and bacterial pathogen or other biological entity (e.g., exosome), which in special cases, can be individual molecules (e.g., proteins). One embodiment applies a micro and/or nano-filtration system to the sample fluid to reduce background or non-targeted entities (e.g., larger sizes of bacteria) and this reduces background spectral noise as well as increasing a purity of the sample fluid. As a secondary effect, the filtering increases a concentration of the sample fluid (e.g., 50-100×) at the start of the system's measurement process. Combined, the five optimization operations listed above can yield a range of increase in S/N from approximately $1.25 \times 10^5$ to $10^6$ overall.

One or more of the S/N optimization operations can be utilized with pre-existing knowledge about expected biological target molecules to "filter" various aspects from "sizes" (e.g., by microfiltration into multiple chambers by particle size, a first chamber filters larger particle sizes, a second chamber filters smaller particle sizes). In an example, a spectral region is selected to find and extract certain spectral features, which will be subjected to data fusion. In one example, a spectral region larger than needed is selected to determine if there are additional features of interest. With a machine learning (ML) example, the spectral region selected may even be extended, since ML will sometimes detect subtle features that are normally not seen in a preselection phase.

Enhancement methods can be combined by choosing a number of specific spectral processes (two or greater) by type to be utilized to examine specific chambers containing molecules of a certain size, and another number of specific spectral processes (two or greater) to examine additional chambers where molecules of a different size are located. By using this multiplicity of spectroscopies appropriate to the molecules of interest, sensitivity and specificity can be increased, often by very large factors by combining operations.

One embodiment of the present disclosure gathers material from humans (e.g., saliva or other bodily fluid) into a disposable plastic sample holder, that is uniquely molded and designed for this application, then filters that liquid using micro and/or nanofiltration into one or more chambers that are fitted with appropriate wavelength transmissive windows, and uses at least one of multi-wavelength UV absorption, fluorescence emission, or specular reflectance to interrogate the samples in those segregating/concentrating chambers individually. Data outputs from these spectroscopies are manipulated, fused, analyzed, and input to an appropriate ML model as part of a data analysis process where specific viruses are then identified and quantified from the appropriate chamber via this system. Bacteria are similarly identified and quantified by interrogating a different chamber that has segregated molecules of size appropriate to bacteria, and the spectroscopic processes repeated to obtain bacterial identification and quantification.

Figure 2:
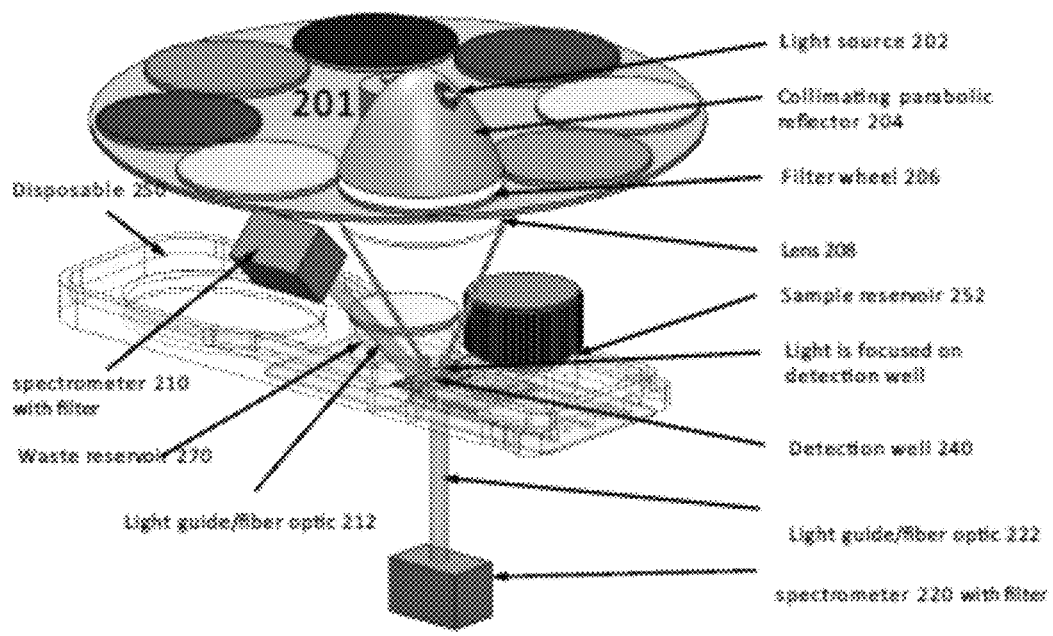
FIG. 2 illustrates a block diagram of a spectrometer system in accordance with one embodiment.

FIG. 1 illustrates one embodiment of a disposable sample holder, and FIG. 2 illustrates a type of measurement setup schematically with a block diagram of a spectrometer system having multiple spectrometer devices in accordance with one embodiment. Any of the spectrometer systems described herein can be handheld miniature spectrometer systems with width, length, and depth dimensions in millimeters (e.g., width 400-500 mm, length 600-700 mm, depth of few hundred mm).

The consumable sample holder 100 of FIG. 1 includes one or more nanofilters or microfilters that separate the collected fluid (e.g., saliva) into individual chambers 120, 130, or a detection well 140, that contains, for example viruses according to their physical sizes, bacteria according to their physical sizes, or any other class of pathogen according to their physical sizes. Each chamber and detection well are fitted with optical windows that allow efficient measurement of the spectroscopic properties of the filtered material for classification and analysis for the purpose of identification and quantification.

In one example, a fluid sample is placed in a fluid well 110 (e.g., saliva well) with a screw on cover (other types of covers can also be utilized). The fluid sample then passes into a chamber 120, then passes into the detection well 140, passes into a chamber 130, and then passes into a waste well 160. In another example, the fluid sample may not pass through both chambers 120 and 130 or has a different pathway through the chambers and detection well. Each chamber can have a micro or nano filter to filter out certain molecule sizes to provide a higher purity of a targeted biological entity, to reduce background or non-targeted entities (e.g., larger sizes of bacteria), and this reduces background spectral noise.

The spectroscopic process and configuration shown in FIG. 2 is one of many such processes possible using the method and system of the present disclosure. In one example, FIG. 2 shows spectrometer system 200 schematically that can measure absorbance with spectrometer 210, light guide/fiber optic 212, and measure fluorescence with spectrometer 220, and light guide/fiber optic 222 (e.g., UV absorbance and UV fluorescence). Spectrometer system 200 examines the sample in disposable 250, which can be analogous to consumable 100 of FIG. 1 having sample contents in nanofilter chambers 120 and 130.

Filter wheel 206 is illuminated by a light source 202 (e.g., UV flashlamp, mid IR light source) to provide the particular wavebands of interest for exciting fluorescence or inducing spectral reflectance within the sample. Any suitable light source can be used in this configuration. A disc 201 also includes a collimating parabolic reflector 204 and a lens 208. Disposable 250 includes similar components in comparison to sample holder 100. Disposable 250 includes a sample reservoir 252, separate chambers having micro or nano filters, a detection well 240, and a waste reservoir 270.

Figure 3:
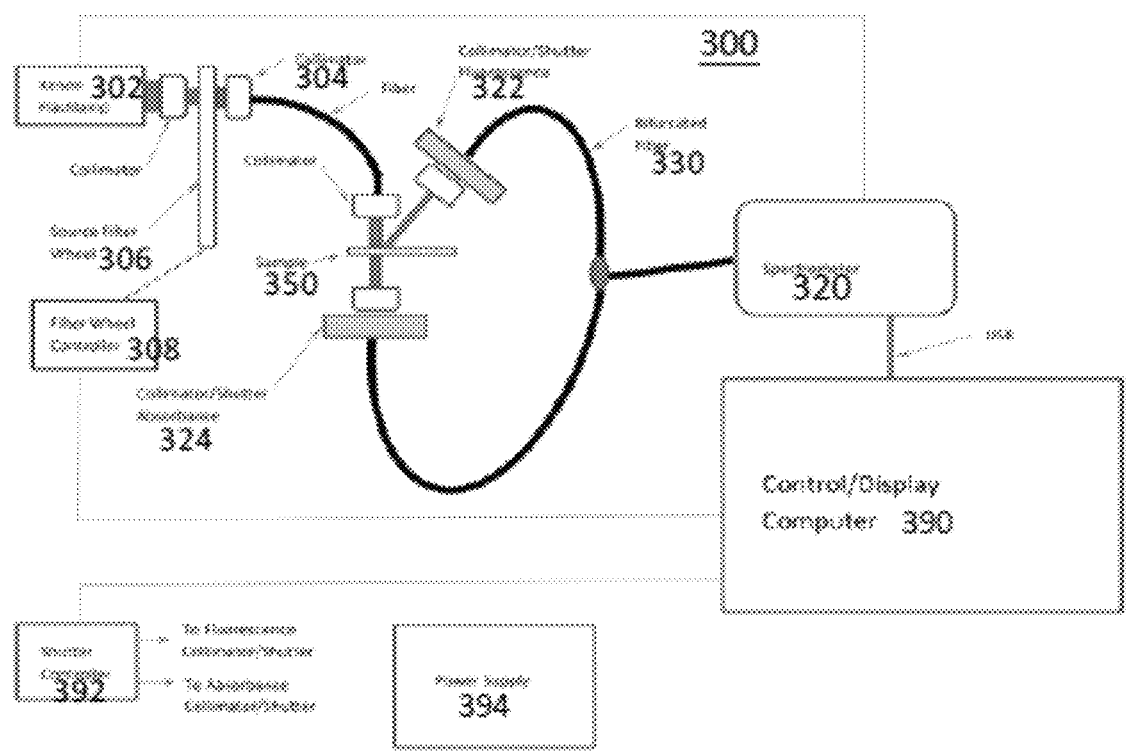
FIG. 3 illustrates a block diagram of a spectrometer system in accordance with an alternative embodiment.

Two spectrometers (e.g., UV spectrometers, IR spectrometers) are illustrated in FIG. 2, but a bifurcated fiber can be implemented to allow use of a single spectrometer 300 as illustrated in FIG. 3. Other set ups with both UV and mid-IR can also be used for various purposes, as well as all related combinations. Data from the spectrometer(s) are subjected to the analysis and manipulation described herein for storage and to determine the specific pathogen(s) present and their quantities.

This embodiment can be used for distinguishing individual viruses in a saliva sample and to measure the concentration via signal quantification.

FIG. 3 illustrates a block diagram of a system 300 having a single spectrometer device 320. System 300 can be implemented in this embodiment by using bifurcated fibers 330 appropriate to the wavelength to simplify hardware considerations. Multiple fiber paths can also be employed when specific wavelengths such as IR and UV are desired to interrogate the molecules, but may need separate emission and detection electronics at different sensitivity scales or dynamic ranges.

System 300 includes a light source 302 (e.g., Xenon flashlamp), filter wheel 306, filter wheel controller 308, various collimators 304, a collimator/shutter fluorescence 322, collimator/shutter absorbance 324, a sample holder 350, spectrometer device 320, a control system 390 (e.g., display computer), a shutter controller 392, and a power supply 394.

Figure 4:
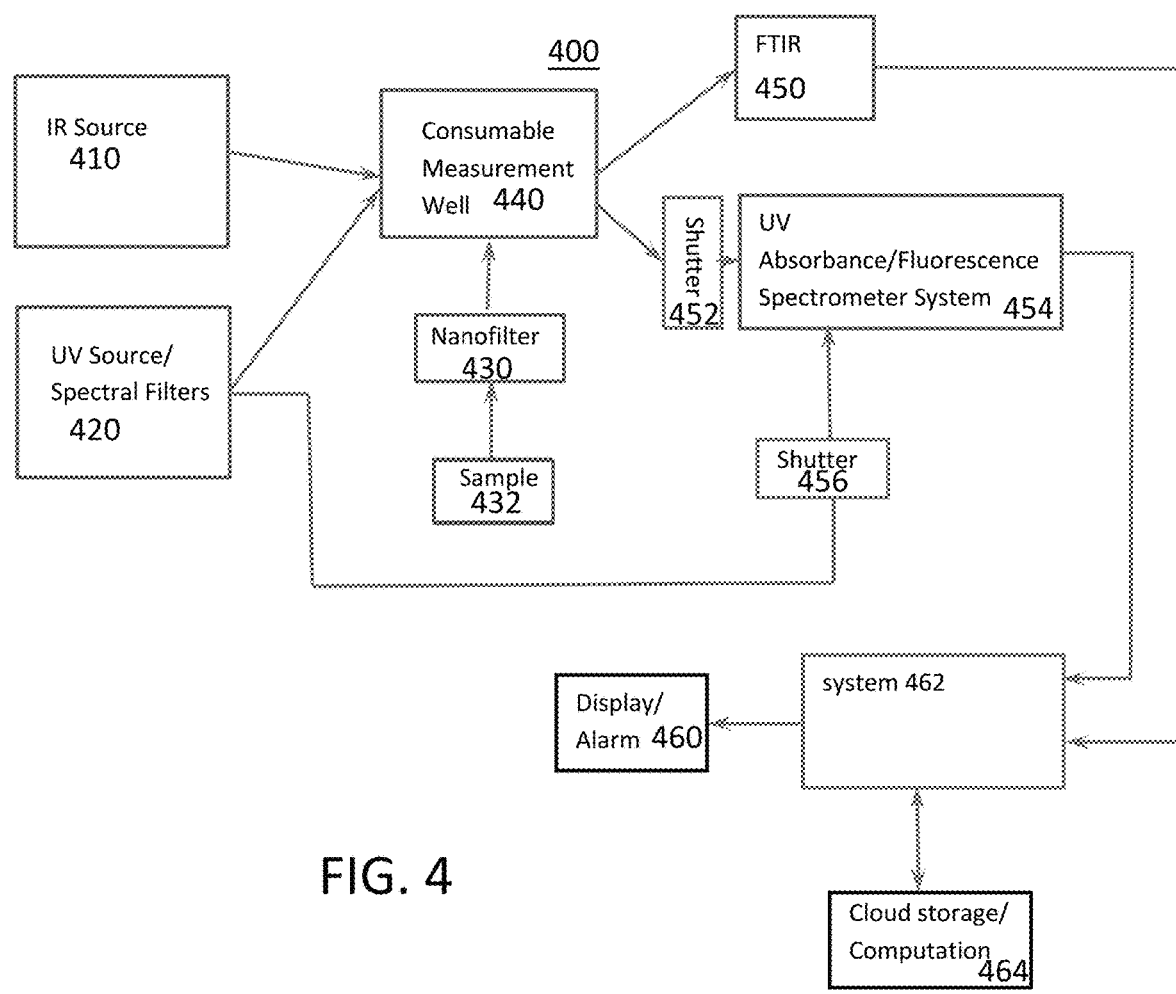
FIG. 4 illustrates a block diagram of a spectrometer system having multiple spectrometer devices in accordance with one embodiment.

FIG. 4 illustrates a block diagram of a spectrometer system having multiple spectrometer devices in accordance with one embodiment. The system 400 includes an IR light source 410 (e.g., collimated MEMS IR source) to provide an IR light to a consumable measurement well 440 having a sample fluid 432 that has been filtered for particle size by nanofilter 430. IR light source 410 (e.g., collimated MEMS IR source) generates light with IR radiation and focuses the IR radiation on a filtered sample in measurement well 440 for in-line measurement. The light source may be electrically pulsed and emit electromagnetic radiation in the wavelength range from 2.5 µm to 14 µm and may include an integral energy concentrating optic to provide energy for a spectral absorption process.

The IR radiation containing the spectral information exits measurement well 440 and is directed towards the Fourier Transform Infrared Spectroscopy (FTIR) device 450. This device 450 and the electronic detector and control system 462 identify and quantify a substance of the sample by examining and analyzing its absorption or transmission spectrum as received by a thermopile or pyroelectric detector of FTIR device 450. In one example, electronic detector and control system 462 comprises an electronics circuit board and computer system for corrections, storage, and analysis of measurements to identify and quantify substances in the spectral range of 2.5 µm to 14 µm. Electronic detector and control system 462 may provide data fusion, artificial intelligence (AI) and/or machine learning (ML) algorithms/databases. The display 460 can display the analysis and the cloud storage having computation 464 can perform analysis and store results.

The system 400 also analyzes UV absorbance and UV fluorescence for a filtered sample in measurement well 440. The UV source 420 directs UV light to the fluid in the measurement well 440 and the UV absorbance/fluorescence spectrometer system 454 will receive a transmitted UV absorbance channel and a reflected UV fluorescent emission channel through shutters 452 and 456. In one example, one or more fluorescence channels are used and if two channels are used then two independent excitation wavelengths are used.

In an example, a UV detector of the spectrometer 454 receives the fluorescent emission channel and another UV detector of the spectrometer 454 receives the UV absorbance channel in order to identify and characterize pathogens, biomarkers, or any compound. In an example, scattering spectra and/or spectral reflectance can also be received and analyzed.

Figure 5:
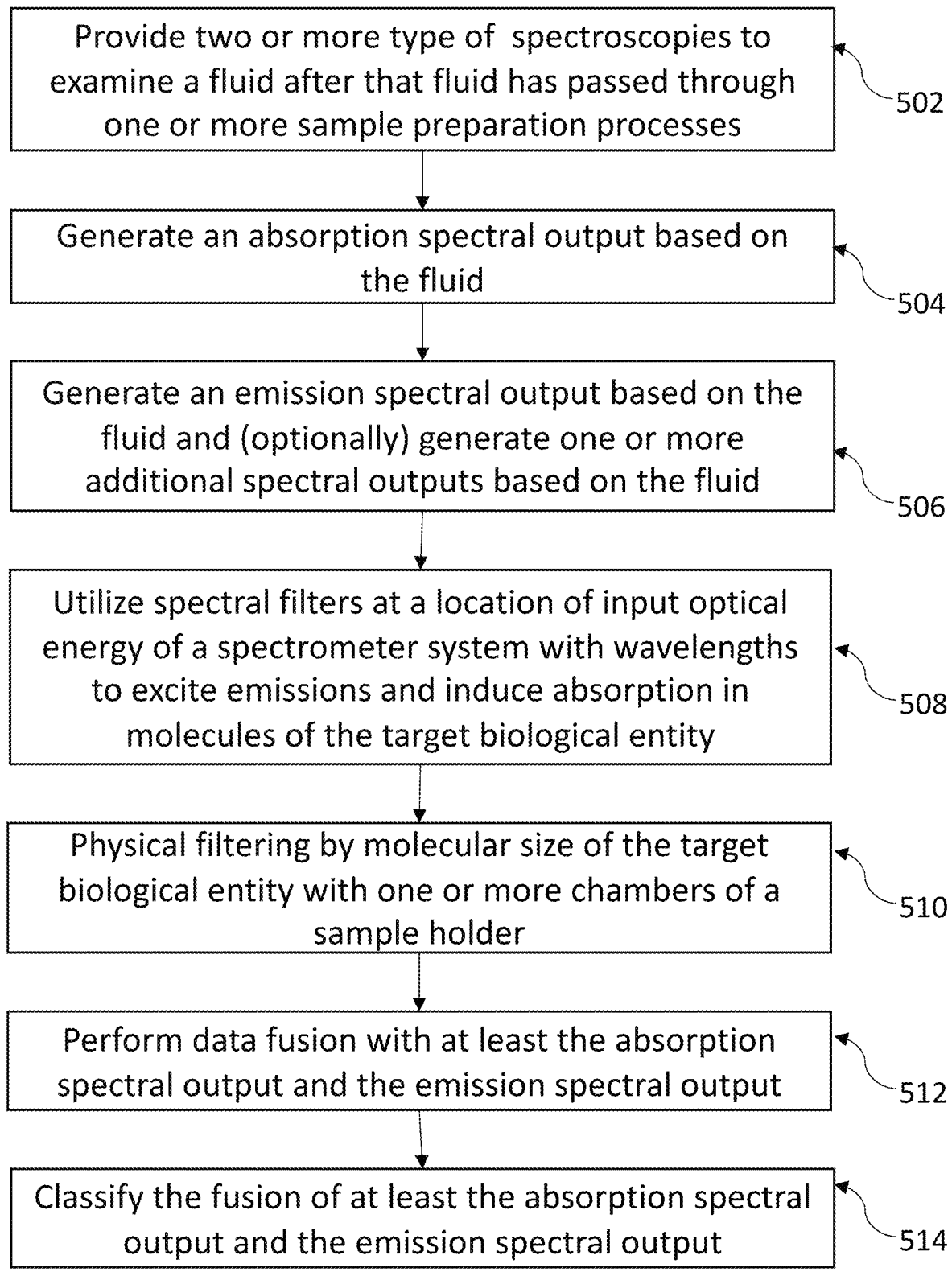
FIG. 5 illustrates a method of processing a sample and performing spectroscopy of the sample with a spectrometer system in accordance with one embodiment.

In one embodiment, a method of processing a sample and performing spectroscopy of the sample with a spectrometer system is illustrated in FIG. 5 in accordance with one embodiment. FIG. 5 illustrates a method that may be executed by a miniature spectrometer device in accordance with one embodiment. In an example, the miniature spectrometer device is a handheld device. In an example, the miniature spectrometer device is a miniature spectrometer system with width, length, and depth dimensions in millimeters (e.g., width 400-500 mm, length 600-700 mm, depth of few hundred mm).

At operation 502, an example method includes providing two or more separate and independent types of spectroscopies including a first miniature spectrometer and a second miniature spectrometer of a spectrometer system in a wavelength range of 200 nm to 14 µm to examine a fluid after that fluid has passed through one or more separate sample preparation processes (e.g., as discussed above) that are designed to increase a purity of a target biological entity in the fluid, to reduce background or non-targeted entities (e.g., larger sizes of bacteria). The preparation processes reduce background spectral noise and thereby enhance signal to noise ratios in measurements and related data analysis operations. In other examples, a different number of (e.g., three, four, five, six, seven) miniature spectrometers can be utilized in the spectrometer system and/or different wavelength ranges (e.g., 100 nm to 10 µm, 100 nm to 20 µm, 150 nm to 20 µm) can be supported.

The spectrometer system includes one or more light sources (e.g., UV light source, collimated MEMS IR source) to generate light with energy, and focus the energy on a fluid of sample holder for in-line measurement. The light source may be electrically pulsed and emit electromagnetic radiation in the wavelength range from 200 nm to 14 µm and may include an integral energy concentrating optic to provide energy for a spectral absorption process. As discussed above, other wavelength ranges can also be utilized.

At operation 504, the method includes generating, with the first miniature spectrometer, a first absorption spectral output based on the fluid. At operation 506, the method includes generating, with the second miniature spectrometer, a second emission spectral output based on the fluid. Optionally, one or more additional miniature spectrometers generate one or more additional spectral outputs based on the fluid. Thus, the methods described utilize two or more spectral outputs based on the fluid including at least an absorption spectral output and at least an emission spectral output. Additional spectral outputs (e.g., scattering and/or spectral reflectance) can also be utilized.

In an example multi-spectral method, the spectroscopies are differentiated by one or more of the following characteristics: the amplitude and/or frequency of excitation, nature of the detected energy, method of detection, and/or in-situ enhancement of the transmitted or re-emitted energy. In an example multi-spectral method, the first miniature spectrometer comprises a first miniature UV absorption spectrometer and the second miniature spectrometer comprises a second miniature UV fluorescence spectrometer.

In one example, the energy containing the spectral information exits the sample holder and is directed to a thermopile or pyroelectric detector (e.g., single thermopile or pyroelectric detector). At operation 508, the method includes utilizing spectral filters at a location of input optical energy of the spectrometer system with wavelengths to excite emissions and induce absorption, scattering and/or spectral reflectance in molecules of the target biological entity.

In one example, an electronic detector and control module (e.g., system 462 in FIG. 4) comprises an electronics circuit board and computer system for corrections, storage, and analysis of measurements to identify and quantify substances.

At operation 510, the multi-spectral method includes physical filtering by particle size of the target biological entity with one or more chambers of the sample holder to increase the purity of target molecules of the target biological entity and thus increase a probability of detection.

In an example, the multi-spectral method further comprises performing data fusion between the first absorption spectral output and the second emission spectral output to generate fused data, at operation 512 and classifying the fusion of the first absorption spectral output and the second emission spectral output, at operation 514. In an example, the fused data can further include scattering data and/or spectral reflectance data. In an example, classification can be performed according to a database of biological entities to signify the presence of pathogens, exosomes, ectosomes, and any other measurable biomarker for the purpose of establishing a specific biological condition, including indications of disease states in a biological entity, presence of biomarkers indicating a particular condition or state, and presence and quantity of various biomarkers in biologically relevant liquids.

In an example multi-spectral method, generating multiple independent spectra during a single analysis corresponding to each of the two or more spectroscopies, and the multiple spectra are treated by one or more of the following analysis techniques to develop a pre-processed data set: (1) summing of the multiple spectra generated by each of the two or more spectroscopies separately to achieve a single multi-dimensional spectrum, which, in an example, can also include an averaging operation corresponding to each of the two or more spectroscopies and having a lower signal-to-noise ratio than any one of the multiple spectra originally generated; (2) truncating the averaged spectra to include specific frequency ranges of interest for one or more of the two or more spectra (in an example, this type of wavelength selection process is done before and after data collections); (3) smoothing and reduction of data sets by using one or more curve-fitting techniques, and other possible techniques related to PCA (Principal Component Analysis) and various signal processing algorithms; (4) normalizing the data sets as needed, by one or more of the parameters from the curve-fitting, and normalizing input into the relevant machine learning model; (5) developing a reduced set of characteristic parameters for each data set to compare with future measurements producing data sets as inputs to signal processing algorithms and ML (Machine Learning) models that are developed to be used as pre-determination of target molecules; (6) utilize training sets and ML to match a new sample with a known set, by normalizing data sets to a specific ML model, replace the normalized data sets by the set of parameters generated by curve-fitting in (3), and using the fit-parameters as input into other ML models, allowing quick and accurate matching from the stored database of "training sets" which may involve at least 100 and possibly 500-1000 samples gathered and analyzed for specific presence of a biological molecule or a "biological condition" available for matching.

The multi-spectral method, wherein dimensionality of generated pre-processed data generated is further reduced by one or more statistical techniques designed to reproduce the data to within an acceptable variance, and which includes but are not limited to: Principal Component Analysis (PCA), Linear Discriminant Analysis (LDA), Multidimensional Scaling (MS), and/or Stochastic Neighbor Embedding (SNE), wherein such approaches are amenable to quantitative evaluation, wherein a result of these steps is input into a specific set of ML processes to "match" stored "conditions" of interest.

In an example, the multi-spectral analysis and evaluation can also include comparing parameters of the result to a pre-determined set of parameters derived from a known population of samples to determine likelihood of a match to one or more of known samples.

In an example, the multi-spectral analysis and evaluation can also include generating a pre-determined set of parameters by performing an analysis method separately upon multiple known samples, corresponding reference blanks (e.g., a sample that contains everything except for the analyte of interest), and mixtures of known samples to establish the parameters characteristic of each of the known samples and the sensitivity and specificity of the measurement for each of the known samples. The data processing can be used as input into a ML process or model for rapid and sensitive analysis, and can be accomplished either in a HIPAA compliant cloud computational database and/or locally in the measurement system or device itself, on "the edge" (a term that indicates information stored local to the device).

In an example, the sample fluid is obtained and prepared by the following processes or a combination of these processes to include, but are not limited to: (1) collection of bodily fluids from the nasal cavity or mouth of humans or animals, as well as collection of sweat, urine and blood; (2) collection of liquid samples from water sources; (3) collection of samples from growing tanks of fish hatcheries; (4) collection of liquid samples from washing water in food processing plants; and/or (5) collection of samples from airborne environments (e.g., as aerosols and vapors) using collection and concentration techniques to provide a liquid medium in order to apply the described testing methods and analysis, etc.

In an example, one or more of the following concentration approaches can be utilized for analytes of interest to improve the spectral signal to noise ratio: (1) washing of collection media and/or retained bodily fluid with a solvent to collect or concentrate analytes of interest; (2) filtration for physical size exclusion of particulates in samples of bodily fluid; (3) centrifugation for separation via physical density differences of materials in bodily fluid; (4) partial or complete dehydration and or devolatilization of the sample of bodily fluid; (5) adsorption of compounds of interest onto media for spectroscopic measurement; and/or (6) adsorption or desorption of interfering compounds.

In an example, selective adsorption/absorption and/or desorption to increase concentration of compounds of interest, which could be use of adsorption/desorption rate based on particular media and/or solvents (i.e., chromatography, with spectroscopy as a detector), and/or adsorption/desorption based batch sample preparation procedure using changes in temperature or reagent to concentrate.

In an example, selective adsorption/absorption and/or desorption to increase concentration of compounds of interest, which could be, for example, adsorption/desorption based on batch sample preparation procedure using changes in temperature or reagent to concentrate.

In an example, mechanisms used for multi-spectral analysis have a capability for compatibility and/or interfaces with the Internet of things (IoT) and processes involved with those interfaces can utilize the IoT for at least a portion of the multi-spectral analysis.

In an example, the multi-spectral analysis approach utilizes characteristic information in the data collected are utilized for identification of new or existing conditions not yet in the database at the time the data are taken.

In an example, the multi-spectral analysis approach utilizes characteristic information in the data collected are utilized for identification of shifts in input data probability distributions over time (e.g., feature drift).

In an example, the multi-spectral analysis approach utilizes a polarizer that is used either in the illumination energy source or near the detection spectrometer to improve S/N by separating polarization in the spectroscopic emissions from the target molecules.

In an example, the multi-spectral analysis approach utilizes one or more non-heuristic computational techniques to detect, correlate, and de-convolute spectral features obtained from a multi-constituent sample. In an example, the output of the non-heuristic computational technique is further compared statistically to a database and/or model derived from application of the multi-spectral approach and the non-heuristic computational technique to a population of known samples where such comparison utilizes correlation factors and/or other statistical metrics to generate probabilities of sample classification pertaining to the known samples. In an example, the non-heuristic computational techniques may include but are not limited to statistical methods, various machine learning (ML) models including neural network models, and/or genetic algorithms.

Thus, in various combinations micro and/or nano filtering a sample fluid to increase purity of a targeted biological entity, to reduce background or non-targeted entities (e.g., larger sizes of bacteria) to reduce background spectral noise and thus increase S/N ratio, using pre-knowledge of the molecular target to focus on a subset of wavelengths for excitation and observation that will further increase S/N ratio can be utilized.

Further, in some combinations, the combined use of two or more spectroscopic processes (EPS) to increase S/N ratio and molecular specificity, fusing all of the resultant data from these processes via various data analysis techniques, and applying specific additional data processing steps, including machine learning models (with large training sets being employed, utilizing hundreds of known condition/samples as well) to those processed data to yield high accuracy via sensitivity and selectivity can be utilized.

In an example, when a single spectroscopic process is used to measure properties of fluids containing indicators of a biological molecule or condition, certain individual molecules or species types are unlikely to be identified over various background signals and noise. As discussed above, applying the sample preparation and EPS approaches described herein (e.g., combining data from two or more spectroscopic processes) and related data analysis, dramatically increases S/N ratio, allow not only better and more frequent identification with high certainty, but also can result in quantification to a high degree of sensitivity and accuracy.

The increase in S/N ratio can be sufficiently large to allow emergent properties in these data sets to be confidently identified, and will can enable new uses and diagnoses. These uses can then be applied to various areas of importance like human health thus creating a pathway to drastically lower healthcare costs, which can save many lives.

Figure 6:
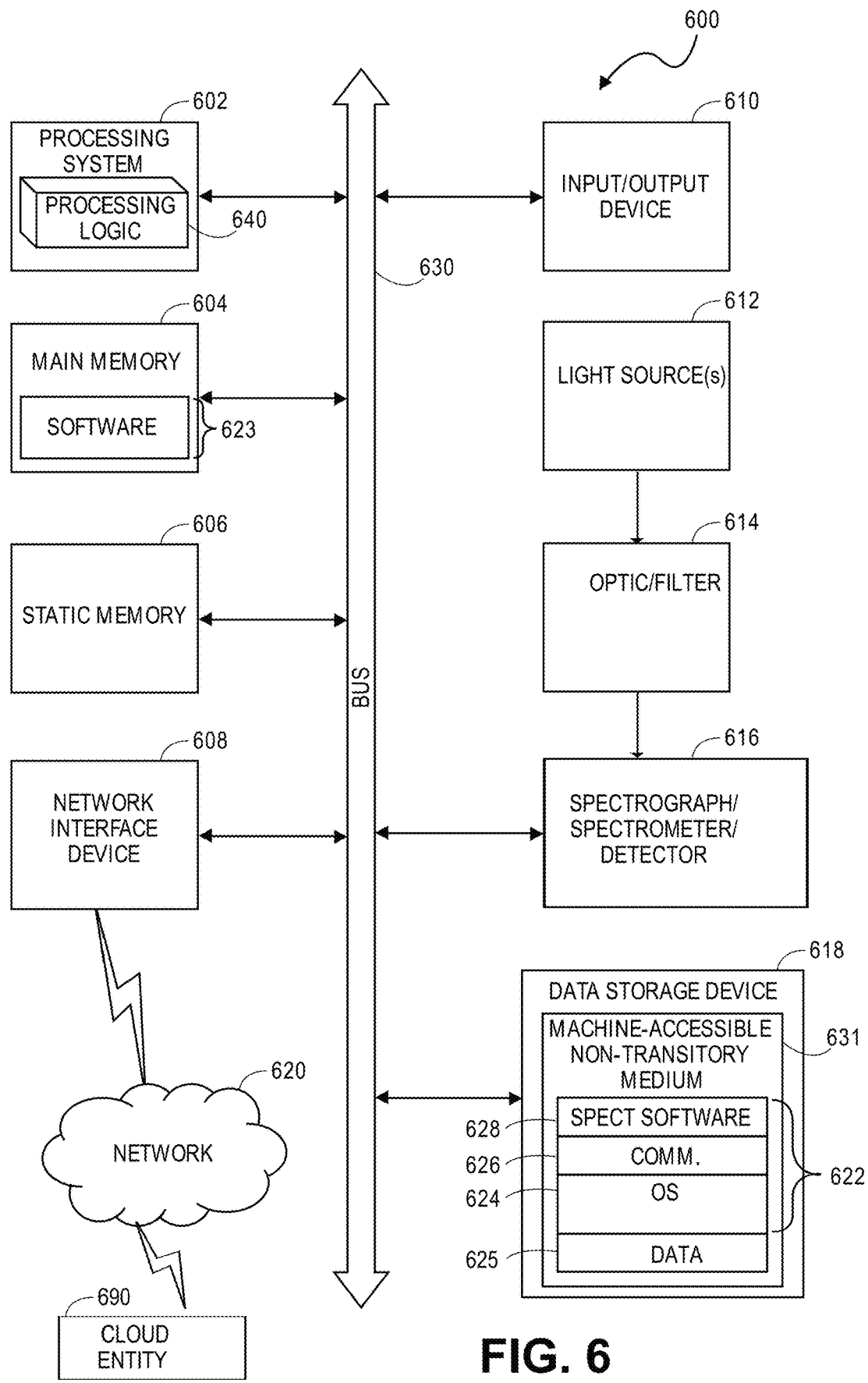
FIG. 6 illustrates a diagrammatic representation of a machine in the exemplary form of a computer system or device 600 within which a set of instructions, for causing the machine to perform any one or more of the methodologies discussed herein, may be executed, in accordance with one embodiment.

FIG. 6 illustrates a diagrammatic representation of a machine in the exemplary form of a computer system or device 600 within which a set of instructions, for causing the machine to perform any one or more of the methodologies discussed herein, may be executed, in accordance with one embodiment. In alternative embodiments, the machine may be connected (e.g., networked) to other machines in a LAN, an intranet, an extranet, the Internet, the IoT, etc. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 600 (e.g., multi-spectral detection device or system 600 that integrates optical components of two or more mini-spectrometers) includes a processing system 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The multi-spectral detection system 600 is configured to execute instructions to perform algorithms and analysis to determine at least one of specific substances detected. For example, the multi-spectral detection system 600 can utilize one or more of the techniques and approaches described herein.

The multi-spectral detection system 600 is configured to collect data and to transmit the data directly to a remote location such as cloud entity 690 that is connected to network 620. A network interface device 608 transmits the data to the network 620. The data collected by the system 600 can be stored in data storage device 618 and also in a remote location such as cloud entity 690 for retrieval, archival and/or further processing.

Processing system 602 represents one or more general-purpose processing devices such as a microprocessor, central processing unit, or the like. More particularly, the processing system 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 602 may also be one or more special-purpose processing devices such as an application specific integrated circuit (ASIC), a field programmable gate array (FPGA), a digital signal processor (DSP), network processor, or the like. The processing system 602 is configured to execute the processing logic 640 for performing the operations and steps discussed herein. The processing system 602 may include one or more of a signal processor, AI module, digitizer, int., and synch detector.

Excitation energy from one or more excitation (i.e., light) source(s) 612 is directed through a spectral filter at target material(s) in order to generate an emission. Although light source(s) 612 are shown, the disclosed embodiments may include any number of excitation sources, including using only a single light source. In an example, light source (or sources) 612 may produce narrow-band energy of about 10 nanometers or less. In another example, the narrow-band energy is about 3 nanometers or less. In an example, light source(s) 612 may be turned on and off quickly, such as in a range of about or less than 0.01 second. In another example, light source(s) 612 may be turned on and off within a time period of about 0.001 second.

Emission energy from the targeted material or biological entity is detected through an optic/low-pass spectral filter 614 prior to being analyzed by a spectrometer of multiple miniature spectrometers 616. Visible light filter may be located in front of optic/low-pass spectral filter 614. Visible light filter helps prevent a large spectrum of light from entering the system so that the large spectrum does not overload the subsequent components with information.

In an example, spectrometers 616 (or array of detectors) are coupled to a synchronous detector of the processing system 602. A miniature spectrometer design platform utilizes multiple spectrometers 616 including UV Fluorescence spectrometer, UV absorption/reflection spectrometer, a near-IR (NIR) spectrometer, a Raman spectrometer, or FTIR spectrometer.

The multi-spectral detection system 600 may further include a network interface device 608. The device 600 also may include an input/output device 610 or display (e.g., a liquid crystal display (LCD), a plasma display, a cathode ray tube (CRT), or touch screen for receiving user input and displaying output.

The data storage device 618 may include a machine-accessible non-transitory medium 631 on which is stored one or more sets of instructions (e.g., software 622) embodying any one or more of the methodologies or functions described herein. The software 622 may include an operating system 624, spectrometer software 628 (e.g., multispectral detection software), and communications module 626. The software 622 may also reside, completely or at least partially, within the main memory 604 (e.g., software 623) and/or within the processing system 602 during execution thereof by the device 600, the main memory 604 and the processing system 602 also constituting machine-accessible storage media. The software 622 or 623 may further be transmitted or received over a network 620 via the network interface device 608.

The machine-accessible non-transitory medium 631 may also be used to store data 625 for measurements and analysis of the data for the detection system. Data may also be stored in other sections of device 600, such as static memory 606, or in cloud entity 690.

In one embodiment, a machine-accessible non-transitory medium contains executable computer program instructions which when executed by a data processing system cause the system to perform any of the methods discussed herein.

The disclosed embodiments allow for an extensive number of applications including detecting and characterizing pathogens and biomarkers.

It will be apparent to those skilled in the art that various modifications and variations can be made in the disclosed embodiments without departing from the spirit or scope of the invention. Thus, it is intended that the present invention covers the modifications and variations of the embodiments disclosed above provided that the modifications and variations come within the scope of any claims and their equivalents.

What is claimed is:

1. A method for multi-spectral analysis comprising: providing two or more separate and independent types of spectroscopies with a spectrometer system, the spectrometer system providing at least a first spectroscopy with a first miniature spectrometer and at least a second spectroscopy with a second miniature spectrometer to examine a fluid after that fluid has passed through one or more sample preparation processes to increase a purity of a target biological entity in the fluid to enhance signal to noise ratios in measurements and related data analysis operations performed by the spectrometer system; generating, with the first miniature spectrometer, a first absorption spectral output signal based on the fluid; generating, with the second miniature spectrometer, a second emission spectral output signal based on the fluid; performing a data fusion with the first absorption spectral output signal and the second emission spectral output signal to generate output data.

2. The method for multi-spectral analysis of claim 1, further comprising:
generating, with one or more additional miniature spectrometers one or more additional spectral outputs based on the fluid; and
utilizing spectral filters at a location of input optical energy of the spectrometer system with wavelengths to excite emissions and induce absorption in molecules of the target biological entity.

3. The method for multi-spectral analysis of claim 1, wherein the one or more sample preparation processes includes at least physical filtering by particle size of the fluid to increase the purity of target molecules of the target biological entity and increase a probability of detection.

4. The method for multi-spectral analysis of claim 1, wherein classifying the output data to identify a viral pathogen, a bacterial pathogen or other biological entity in the fluid further comprises classifying the first absorption spectral output and the second emission spectral output according to a database of biological molecules to signify the presence of pathogens, exosomes, ectosomes, and other measurable biomarker in a biological entity to identify presence and quantity of the biological molecules in the fluid.

5. The method for multi-spectral analysis of claim 1, wherein the first miniature spectrometer comprises a first miniature UV absorption spectrometer and the second miniature spectrometer comprises a second miniature UV fluorescence spectrometer.

6. The method for multi-spectral analysis of claim 1 wherein the spectroscopies are differentiated by one or more of the following characteristics: amplitude and/or frequency of excitation, nature of detected energy, and in-situ enhancement of transmitted or re-emitted energy.

7. The method for multi-spectral analysis of claim 1, wherein dimensionality of generated pre-processed data used in the classification is reduced by one or more statistical techniques designed to reproduce the data to within an acceptable variance, which includes one or more of: Principal Component Analysis (PCA), Linear Discriminant Analysis (LDA), Multidimensional Scaling (MS), and/or Stochastic Neighbor Embedding (SNE).

8. A spectrometer system configured to perform multi-spectral analysis, the spectrometer system comprising: a first miniature spectrometer configured to provide a first spectroscopy to examine a fluid after that fluid has passed through one or more sample preparation processes, and configured to increase a purity of a target biological entity in the fluid and to generate an absorption spectral output signal based on a fluid; a second miniature spectrometer configured to provide a second spectroscopy to generate an emission spectral output signal based on the fluid;
and a processing system coupled to receive the absorption spectral output signal and the emission spectral output signal, the processing system configured to perform a data fusion with the absorption spectral output signal and the emission spectral output signal, and thereby configured to generate output data and to classifying the output data to identify a viral pathogen, a bacterial pathogen or other biological entity in the fluid.

9. The spectrometer system of claim 8, wherein the processing system further receives a scattering spectral output signal based on the fluid and performs data fusion with the absorption spectral output signal, the emission spectral output signal and the scattering spectral output signal to generate the output data.

10. The spectrometer system of claim 8 further comprising a third miniature spectrometer of to provide a third spectroscopy to generate a spectral reflectance output signal based on spectral reflectance properties of a particle of interest in the fluid, wherein the processing system performs data fusion with the absorption spectral output signal, the emission spectral output signal and the spectral reflectance output signal.

11. The spectrometer system of claim 8 wherein the processing system is further configured to generate multiple independent spectra during a single analysis corresponding to each of multiple spectroscopies, and wherein the multiple spectra are treated by one or more of the following to develop a pre-processed data set:
   summing of the multiple spectra generated by each of the multiple spectroscopies separately to achieve a single multi-dimensional spectrum corresponding to each of the spectroscopies and having a lower signal-to-noise ratio than corresponding original spectra, wherein the single multi-dimensional spectrum includes extracted characteristic features from the multiple independent spectra;
   truncating averaged spectra to include specific frequency ranges of interest for the first and second spectra wherein a type of wavelength selection process is done before and after data collections;
   smoothing and reduction of data sets by using one or more curve-fitting techniques;
   smoothing and reduction of data sets by using signal processing techniques;
   normalizing data sets as needed, by one or more of the parameters from the curve-fitting, and normalizing input into a machine learning model;
   developing a reduced set of characteristic parameters for each data set to compare with future measurements producing data sets as inputs to signal processing algorithms and machine learning models that are developed to be used as pre-determination of target molecules; and
   utilizing training sets and machine learning models to match a new sample with a known set by normalizing data sets to a specific machine learning model, replacing the normalized data sets by set of parameters generated by curve-fitting, and using the fit-parameters as input into other machine learning models.

12. The spectrometer system of claim 8 wherein the processing system is further configured to compare parameters of the result to a pre-determined set of parameters derived from a known population of samples to determine likelihood of a match to one or more of known samples.

13. The spectrometer system of claim 8 wherein the processing system is further configured to generate a pre-determined set of parameters by performing an analysis separately upon multiple known samples, corresponding reference blanks and mixtures of known samples to establish the characteristics of known samples and sensitivity and specificity of a corresponding measurement for the known samples to be used as input into a machine learning process or model.

14. The spectrometer system of claim 8 wherein the fluid is obtained and prepared by one or more of: collection of bodily fluids from the nasal cavity or mouth of humans or animals, as well as collection of sweat, urine and blood; collection of liquid samples from water sources; collection of samples from growing tanks of fish hatcheries; collection of liquid samples from washing water in food processing plants; and collection of samples from airborne environments as aerosols or vapors using collection and concentration methods into a liquid medium.

15. The spectrometer system of claim 8 wherein characteristic information in the data are utilized for identification of shifts in input data probability distributions over time.

16. A spectrograph detector having a processing system comprising: a first interface configured to receive an absorption spectral output signal from a first miniature spectrometer that is configured to provide a first spectroscopy based on a fluid after that fluid has passed through one or more sample preparation processes, and configured that to increase a purity of a target biological entity in the fluid; a second interface configured to receive an emission spectral output signal from a second miniature spectrometer that provides a second spectroscopy based on the fluid; wherein the processing system is configured to perform a data fusion with the first absorption spectral output signal and the second emission spectral output signal in order to generate output data and to classify the output data to identify a viral pathogen, a bacterial pathogen or other biological entity in the fluid.

17. The spectrograph detector of claim 16 wherein the processing system is further configured to receive a scattering spectral output signal based on the fluid, wherein the processing system performs data fusion with the absorption spectral output signal, the emission spectral output signal and the scattering spectral output signal to generate the output data.

18. The spectrograph detector of claim 15 wherein the one or more sample preparation processes comprise utilization of one or more of: washing of collection media and retained bodily fluid with a solvent to collect or concentrate analytes of interest; filtration for physical size exclusion of particulates in samples of bodily fluid; centrifugation for separation via physical density differences of materials in bodily fluid; partial or complete dehydration and or devolatilization of the sample of bodily fluid; adsorption of compounds of interest onto media for spectroscopic measurement; adsorption or desorption of interfering compounds; adsorption or desorption based on particular media and/or solvents; and adsorption or desorption based batch sample prep procedure using changes in temperature or reagent to concentrate.

19. The spectrograph detector of claim 16 wherein characteristic information in data collected are utilized for identification of new or existing conditions not yet in a database at the time the data are taken.

20. The spectrograph detector of claim 16 wherein one or more non-heuristic computational approaches are used to detect, correlate, and de-convolute spectral features obtained from a sample, wherein the output of the non-heuristic computational approach is further compared statistically to a database or model derived from application of the classification to a population of known samples, where the comparison utilizes correlation factors to generate probabilities of sample classification pertaining to the known samples, wherein non-heuristic methods include one or more of: statistical approaches, one or more machine learning models and genetic algorithms.

21. The spectrograph detector of claim 16 wherein the processing system is further configured to generate a pre-determined set of parameters by performing an analysis separately upon multiple known samples, corresponding reference blanks and mixtures of known samples to establish the characteristics of known samples and sensitivity and specificity of a corresponding measurement for the known samples to be used as input into a machine learning process or model.

* * * * *